United States Patent [19]
Johnson et al.

[11] Patent Number: 5,338,553
[45] Date of Patent: Aug. 16, 1994

[54] PROCESS OF TREATING WATER CONTAINING EFFLUENT FROM CHEESE-MAKING OPERATIONS

[75] Inventors: David A. Johnson; Jeffrey D. Lorch, both of Hudson, Wis.

[73] Assignee: Niro, A/S, Soeborg, Denmark

[21] Appl. No.: 944,786

[22] Filed: Sep. 15, 1992

[51] Int. Cl.$^5$ ............................................. A23C 9/12
[52] U.S. Cl. ........................................ 426/36; 426/34; 426/41; 426/582; 426/583
[58] Field of Search ............... 426/36, 34, 38, 39, 426/40, 41, 491, 580, 582, 583, 425, 431, 490, 492, 586

[56] References Cited

U.S. PATENT DOCUMENTS

| | | | |
|---|---|---|---|
| 3,707,770 | 1/1973 | Timmins et al. | 426/491 |
| 4,001,198 | 1/1977 | Thomas | 426/491 |
| 4,497,836 | 2/1985 | Marquardt et al. | 426/491 |
| 4,897,277 | 1/1990 | Dieu et al. | 426/491 |
| 4,919,943 | 4/1990 | Yee et al. | 426/42 |

OTHER PUBLICATIONS

Kirk-Othmer Encyclopedia of Chemical Technology, John Wiley & Sons, Inc., New York, 1981, vol. 15, pp. 92–126.
Kirk-Othmer Encyclopedia of Chemical Technology, John Wiley & Sons, Inc., New York, 1981, vol. 23, pp. 439–461.
Kirk-Othmer Encyclopedia of Chemical Technology, John Wiley & Sons, Inc., New York, 1981, vol. 24, pp. 349–353.

Primary Examiner—Donald E. Czaja
Assistant Examiner—Leslie Wong
Attorney, Agent, or Firm—Armstrong, Westerman, Hattori, McLeland & Naughton

[57] ABSTRACT

A process for treating waste water produced in a cheesemaking operation. The process comprises treating a milk product so as to form a curd, subjecting the curd to an elevated temperature while in contact with water and separating the curd from a water-containing material including milk fats. The process further includes subjecting the water-containing material to microfiltration in a microfilter so as to produce a concentrate rich in the milk fats and a permeate, and recovering the concentrate and the permeate.

10 Claims, 5 Drawing Sheets

PROCESS OF TREATING WATER CONTAINING EFFLUENT FROM CHEESE-MAKING OPERATIONS

The present invention relates generally to processes for treating waste water from cheese-making operations so as to remove contained components such as fats, proteins, sugars, salts and the like therefrom and, more particularly, to processes wherein a waste water is treated with microfiltration so as to produce a concentrate having a relatively high fat concentration and a permeate stream suitable for recycle and/or disposal without attendant environmental pollution problems.

While the processes of the subject invention will be discussed primarily hereinafter with reference to the removal of materials such as solids from a water-containing stream in the manufacture of cheese and the like, it is to be understood that the use and the application of the subject invention is not thereby so limited. For example, the invention may be useful in the removal of other undesirable components from waste waters in other dairy product processing operations or like processes where product or byproduct streams are to be treated to remove and/or recover suspended or dissolved components contained in the waste water to facilitate recycle or disposal of the waste water.

In cheese-making operations such as in the manufacture of mozzarella type cheese for example, it has been the conventional practice to make the cheese by the following general sequence of steps. First, milk or suitable milk products are treated with a starter culture in a cheese-making vessel such as a vat so as coagulate casein and/or other proteins contained in the milk product to thereby produce solids (curd) and the solids are then set by suitable means as is known in the art. Second, the curd is separated from remaining liquid or whey by decantation, draining or like procedures. Third, the curd is subjected to an elevated temperature in a so-called cooking operation and then extruded or otherwise formed into suitable mass or block of finished cheese. The cooking operation and the extrusion process may be conducted in, for example, a cooking-extruding machine. Lastly, the finished cheese may be subjected to a salting operation such as by immersing the mass or block of cheese in a suitable brine solution such as salt water.

In the above-mentioned third step where the curd is subjected to an elevated temperature in the cooking operation, it is common practice to heat and work the curd in a water bath at a temperature up to 140° F. or more. During the cooking procedure, various solids such as milk fat, proteins, lactose and salts are extracted from the cheese into the water thereby "contaminating" the water. In order to maintain efficiency of the cooking operation, it is necessary to continually draw off a portion of the contaminated waste water forming the bath and replenish this drawn off waste water with fresh water thereby "rinsing" the cheese product.

The so-called contaminated or waste water from the cooking operation is produced in significant quantities and must either be disposed of in an acceptable manner or treated in some fashion to recover the solids contained therein since direct disposal into sewage systems, waterways or the like is environmentally unacceptable and therefore generally prohibited. In has been the one general practice to use this contaminated water directly as a supplemental animal feed or to apply the contaminated water to agricultural fields as a fertilizer. These uses, while generally satisfactory, have the disadvantages that relatively expensive transportation costs may be incurred and there is little recovery of the value of the materials such as solids contained in the contaminated water. In addition, there are potential environmental pollution implications since the contaminated water has a high biochemical oxygen demand (BOD) when directly applied agricultural fields.

Another general practice as an alternative use of the contaminated water is to treat the water by centrifugal separation to recover some of the contained fats and the like and then mix the recovered fats with the whey stream from the above-mentioned second step in the cheese-making process.

While this treatment process has the advantage that some of the contained materials in the waste water are recovered, centrifugal separation tends to be rather inefficient in that the proportion of contained materials which are recovered is low. For example, generally at most about 60–65% of the fat contained in the contaminated water is recovered by centrifugal separation. In addition, because the contaminated water tends to have a relatively high fat content, the quality of the whey stream is degraded due to an excess fat content when the separated solids are added. Furthermore, because the salt content of the waste water being treated is quite high, the waste water tends to be quite corrosive. As such, conventional centrifugal separators utilized in the dairy products industry tend to significantly corrode when treating this type of waste water. Centrifugal separators capable of withstanding the corrosiveness of the waste water must be constructed of special corrosion-resistant materials which makes the separators quite expensive.

In some known cheese-making processes, the above-mentioned salting operation may be conducting prior to or in conjunction with the cooking operation. This combined procedure is advantageous since the time necessary for the last step in the above process, the salting operation, is reduced or even eliminated and therefore the overall cheesemaking process requires considerably less time to conduct. However, the resultant waste water stream from the cooking operation in this combined type process tends to contain even greater amounts of colloidal, suspended and dissolved materials and thus presents more difficult problems in the handling and disposal of the waste water.

Thus there exists a need for suitable processes for treating the above types of waste water from dairy product manufacturing operations which enable efficient reuse of the water, recovery of most if not all of the values contained in the waste water, and environmentally safe disposal thereof if necessary.

SUMMARY OF THE INVENTION

It is therefore a feature of the subject invention to provide processes for the recovery of colloidal, suspended or dissolved materials from a waste water from cheese-making operations.

It is another feature of the subject invention to provide processes for the recovery of colloidal, suspended or dissolved materials from a waste water from cooking cheese curd in cheese-making manufacture.

It is yet another feature of the present invention to provide a process for the treatment of waste water from cheese making operations which utilizes microfiltration to produce a salable concentrate from the microfiltration.

It is a further feature of the present invention to provide a process for the treatment of waste water from cheese making operations which utilizes microfiltration to produce a permeate which is environmentally suitable for direct disposal.

It is a yet another feature of the present invention to provide a process for the treatment of waste water from cheese making operations which utilizes microfiltration to produce a permeate from the microfiltration which is suitable for blending with a whey stream or recycle to the cheese cooking operation.

It is a further feature of the present invention to provide a process for the treatment of waste water from cheese making operations which utilizes microfiltration in combination with reverse osmosis filtration or nanofiltration to produce a permeate which is environmentally suitable for direct disposal.

It is a yet another feature of the present invention to provide a process for the treatment of waste water from cheese making operations which utilizes microfiltration in combination with reverse osmosis filtration or nanofiltration to produce a permeate from the microfiltration which is suitable for blending with a whey stream or for evaporation to recover contained salts.

Briefly, the present invention comprehends in its broader aspects a process for treating a water-containing material generated in cheese-making operations, the process comprising providing a water-containing material which includes fats, subjecting the water-containing material to microfiltration in a microfilter so as to produce a concentrate rich in said fats and a permeate, and recovering said concentrate and said permeate. Generally, the concentrate from the microfilter contains from about 10% to about 50% fats, preferably at least about 40% fats.

The present invention further comprehends a cheese-making process comprising treating a milk product so as to form a curd, contacting the curd with water to form a water containing material including milk fats, separating the curd from a water-containing material including milk fats, subjecting the water-containing material to microfiltration in a microfilter so as to produce a concentrate rich in said milk fats and a permeate, and recovering said concentrate and said permeate. The concentrate from the microfilter contains from about 10% to about 50% fats, preferably at least about 40% fats.

Further features, objects and advantages of the processes of the present invention will become more fully apparent from a detailed consideration of the arrangement and construction of the constituent portions of the process as set forth in the following description when taken together with the accompanying drawings.

DETAILED DESCRIPTION OF THE PREFERRED EMBODIMENTS

As was previously mentioned, the subject invention is directed to processes for the removal of colloidal, suspended and;/or solid materials from waste water from dairy product processing such as in cheese- making operations. For the purposes of illustration only, the subject processes are described hereinafter with reference to a particularly preferred processes for the removal of solid materials from waste water from cheese curd cooking and curd salting operations as well as in connection with treatment of whey obtained from drainage of formed cheese.

Figure 1:
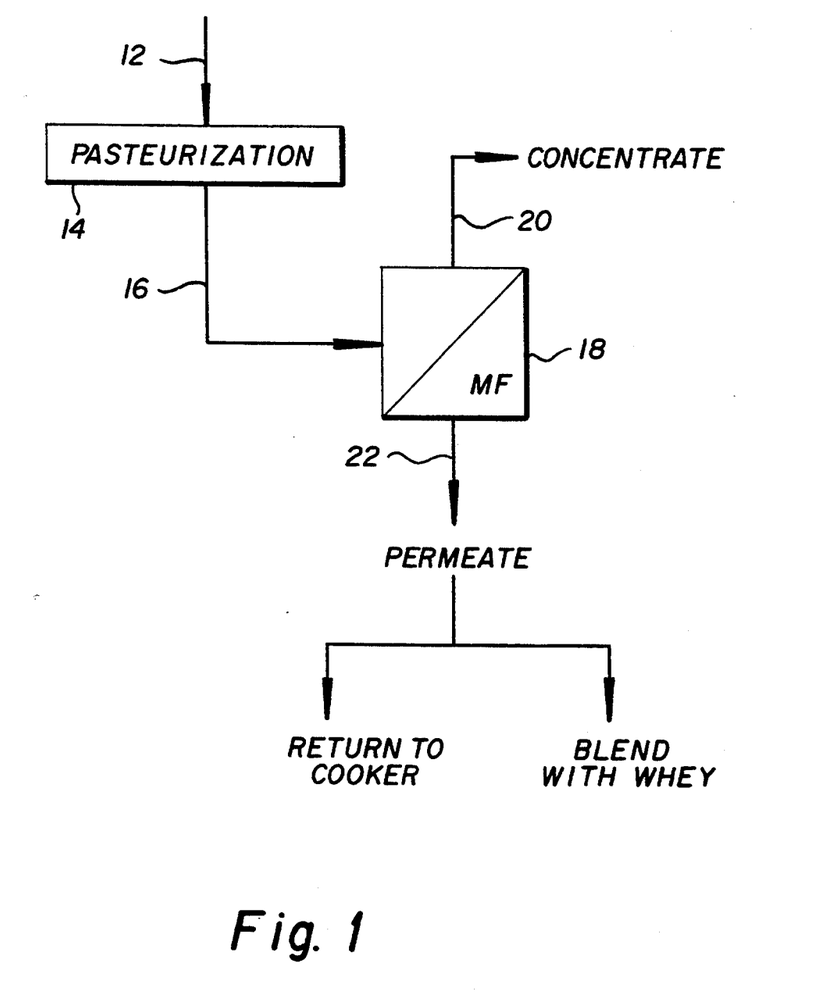
FIG. 1 is a simplified process flow diagram of one embodiment of a treatment process for waste water from cheese making operations according to the present invention.

In a particularly preferred process as illustrated by the process flow diagram of FIG. 1, waste water containing various materials such as solids which is drawn off during the cooking operation in the manufacture of cheese is carried by line 12 to pasteurization unit 14 where the waste water is pasteurized at an elevated temperature by suitable means as is well known in the art. The pasteurized waste water flows from unit 14 through line 16 to microfilter 18 where the waste water is separated into two streams leaving the filter in lines 20 and 22. Line 20 carries a concentrate separated from the waste water containing up to 40% fat or more which is suitable for sale as a cream-type dairy product. Line 22 carries a permeate of mainly water plus lactose and natural milk salts which can be recycled as wash water to the cooking operation and/or blended with whey stream in much the same manner as the solids from conventional centrifugal separation are mixed with the whey stream.

Filter 18, as mentioned above, is a microfilter which may be of various constructions and designs of the type which are adapted to separate colloidal and suspended particles in the size range of less than about 10 microns, generally in the range of about 0.05 to about 10 microns, which do not develop osmotic pressure. Generally such microfilters operate at low pressure of about 30 psi or less, such as in the range of about 10–20 psi, have quite high fluxes, and may contain cross-flow membranes of ceramic and/or polymeric materials. Such microfilters are conventionally used in the corn-wet milling industry to clarify dextrose, in the filtration of gelatin prior to concentration, and in the sterilization of water.

A particularly preferred microfilter for the purposes of the present invention utilizes ceramic membranes alone or conjunction with membranes of other materials such as polymeric membranes having the same pore size, the ceramic membranes having pores with a homogeneous pore size of about 500–2000 angstroms, most preferably 500–1000 angstroms, and being in a tubular configuration. Further details as to ceramic type membranes suitable for microfiltration are set forth by R. R. Bhave, *Inorganic Membranes: Synthesis, Characteristics and Applications*, Van Nostrand-Reinhold, New York, 1991.

Suitable materials for membranes in microfiltration other than ceramic materials which may be used alone or in combination with ceramic membranes include appropriate polymeric materials such as cellulose acetates, polyvinyl chlorides, polyamides, polysulfones, polyethersulfones and the like in various cross-flow configurations such as plate and frame, spiral wound, hollow fiber, tubular, cartridge and the like. Further details as to suitable microfilters may be found in the *Kirk-Othmer Encyclopedia of Chemical Technology*, John Wiley & Sons, Inc., New York, 1981, with particular attention directed to volume 15, pages 92-126, and volume 23, pages 439-461. Additional information regarding microfiltration may be found in the texts by E. Renner and M. H. Abd El-Salam, *Application of Ultrafiltration in the Dairy Industry*, Elsevier Science Publishers, Essex, England, 1991 and by W. S. Winston Ho et al, Eds., *Membrane Handbook*, Van Nostrand-Reinhold, New York, 1992, all of the above publications being incorporated by reference herein.

Several important advantages are realized by the use of the process as illustrated in FIG. 1. Among others, almost complete recovery of the fats contained in the waste water, for example, up to 99% fat recovery, can be achieved and, in addition, a salable product is realized. Furthermore, the permeate is suitable for recycling to either of two processing streams thus essentially eliminating the need for any type of disposal of the waste water or its components.

Figure 2:
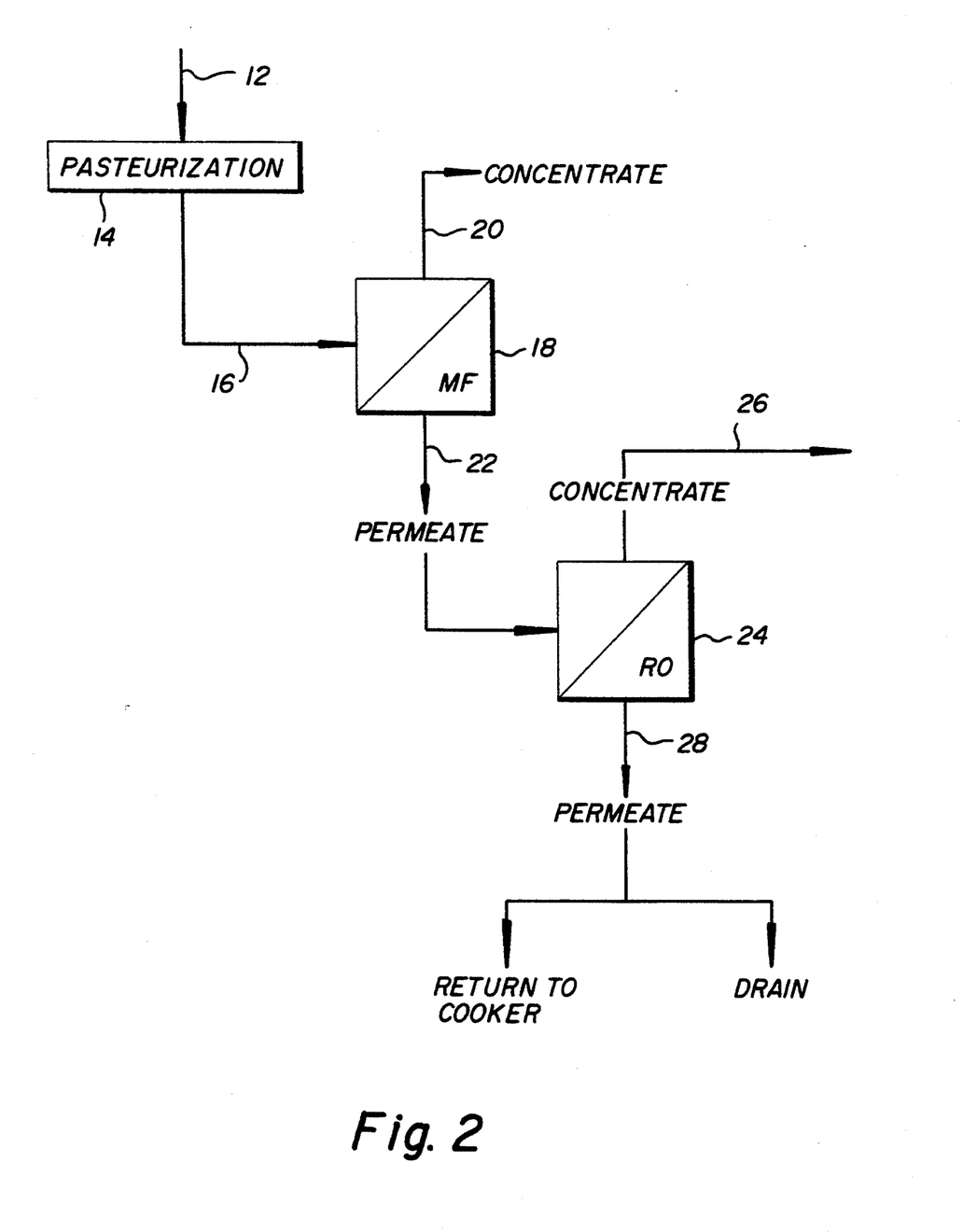
FIG. 2 is a simplified process flow diagram of another embodiment of a treatment process for waste water from cheesemaking operations according to the present invention.

FIG. 2 illustrates a modification of the process as shown in FIG. 1 which is particularly suitable for those cheese-making operation in which the permeate as produced according to the process of FIG. 1 is not suitable for reuse in the cooking unit or for mixing with the whey stream due to unacceptably high content of one or more contained components such as milk sugars like lactose and/or milk salts due to the particular type of cheese or dairy product being manufactured.

As in FIG. 1, the process according to the present invention as illustrated in FIG. 2 has waste water containing various materials such as solids drawn off during the cooking operation which is carried by line 12 into pasteurization unit 14. Alternatively, waste water in line 12 may be water used in rinsing curd after separation of the whey and prior to the cooking operation, the rinse water being used to remove lactose and the like from the cheese so as to improve the heat resistance property of the cheese.

In unit 14, the waste water is pasteurized at an elevated temperature by suitable means as is well known in the art. The pasteurized waste water then flows from unit 12 through line 16 to microfilter 18 where the waste water is separated into two flow streams leaving the microfilter in lines 20 and 22. Line 20 contains a concentrate from the waste water which contains up to 40% fat or more which again is suitable for sale as a cream-type dairy product.

Line 22 from microfilter 18 carries a permeate stream of mainly water which contains lactose and natural milk salts to a reverse osmosis filtration unit 24 where the permeate is separated into a second concentrate exiting the filtration unit via line 26 and a second permeate exiting the unit by line 28. The concentrate in line 26 contains a relatively high concentration of lactose which can be used and/or recovered in further processing operations. The permeate in line 28 which is essentially pure water may be recycled as wash water to the cooking unit and/or discarded through conventional sewage systems with no adverse environmental effects.

Reverse osmosis filter 24 may be of various constructions and designs of the type which are adapted to utilize membranes and which concentrate and dewater streams using only the energy of high pressure supplied by a pump. Generally these reverse osmosis filters, sometimes called hyperfilters, separate relatively smaller components having a molecular weight of less than about 500, that is, on a micromolecular scale of less than 1 nm, and osmotic pressures are quite high. These hyperfilters operate at pressures in excess of about 150 psi up to about 600 psi and at temperatures from about 0° to 50° C. Presently preferred reverse osmosis filters are spiral type cartridges, flat sheet membranes, and tubular membranes which are conventionally used in water treatment type processes and particularly those reverse osmosis filters used in the dewatering of whey. Suitable membranes for reverse osmosis filtration include thin film composites of polyamides as well as cellulose acetates, polysulfones and the like. Further details as to suitable reverse osmosis filters or hyperfilters may be found in the *Kirk Othmer Encyclopedia of Chemical Technology*, John Wiley & Sons, Inc., New York, 1981, with particular attention directed to volume 15, pages 92-126, and volume 24, pages 349-353, incorporated by reference herein, as well as the publications of Renner et al. and Ho et al. mentioned previously.

In addition to the advantages set forth with regard to the process of FIG. 1, the process of FIG. 2 further provides other distinct and important advantages. Among these advantages are that the reverse osmosis filtration provides a concentrate which is highly concentrated in milk sugars such as lactose, etc. that is particularly suitable for other uses. In addition, the permeate from the reverse osmosis filter is essentially pure water which is highly suitable for reuse in the cooking unit and thus significant savings in water and sewage treatment costs can be realized in the operation of the cooking unit in terms of wash water requirements.

Figure 3:
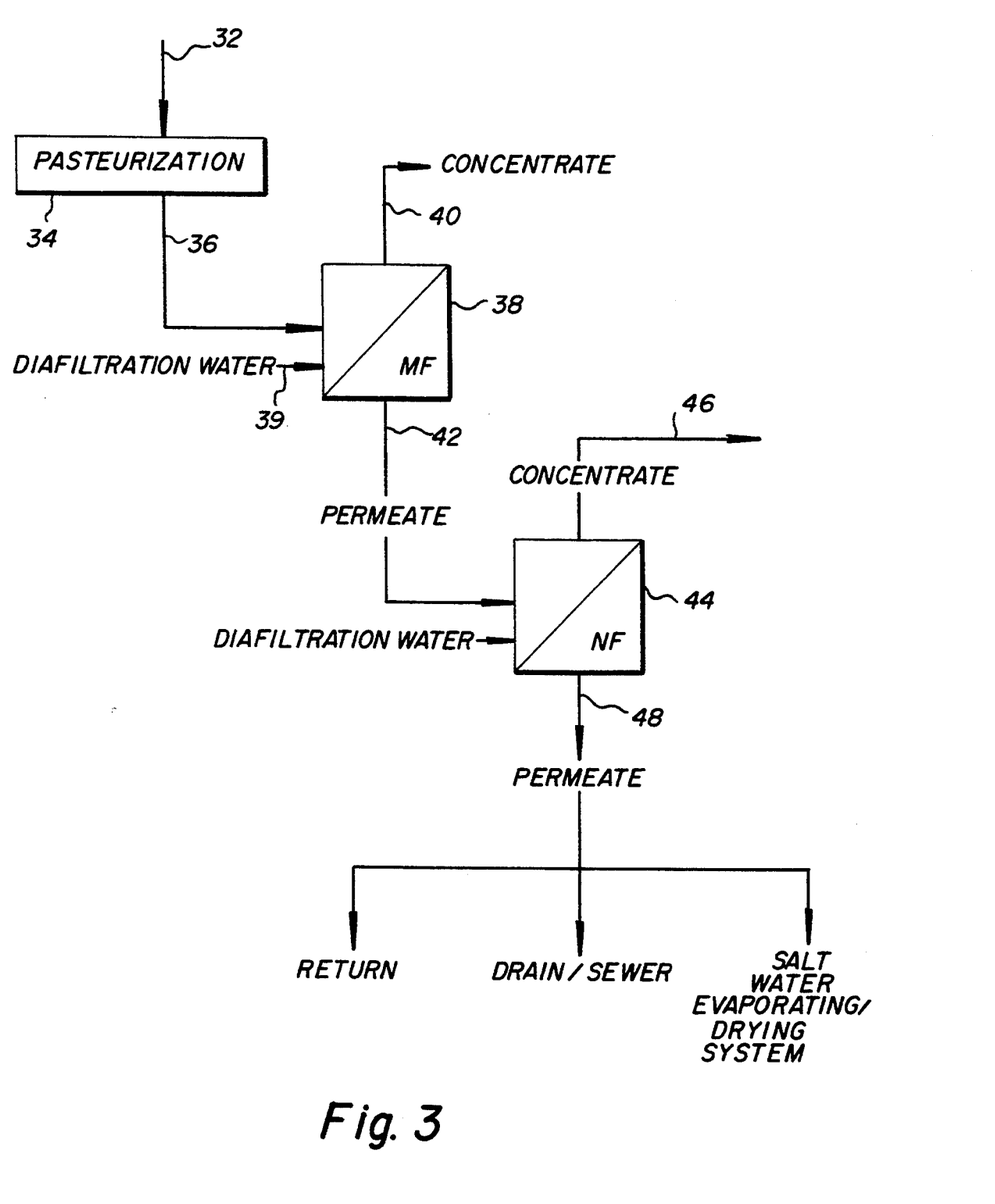
FIG. 3 is a simplified process flow diagram of yet another embodiment of a treatment process for waste water from cheese-making operations according to the present invention.

A further embodiment of the processes of the present invention is schematically illustrated in FIG. 3. The process of this embodiment is particularly suitable for use in treating waste water from a cooking unit wherein the curd is salted prior to or during the cooking operation. As such, the waste or contaminated water emanating from the cooking unit contains a relatively high concentration of salts such as brine salts.

In this particular waste water treatment process, waste water from a cooking unit (not shown) having a relatively high concentration of salts is transported by line 32 into pasteurization unit 34 where the water is subjected to an elevated temperature and then fed via line 36 to microfilter 38. Microfilter 38 may be of the same type as described above with reference to the process illustrated in FIG. 1. Fed into microfilter 38 concurrently with the waste water in line 36 is diafiltration water in line 39. Diafiltration is a specific type of filtration process as defined hereinafter in which the retentate is further purified or the permeable solids are extracted further by the addition of water to the retentate.

In microfilter 38, the waste water from line 36 is subjected to a separation into a concentrate and a permeate. The concentrate exits microfilter by line 40 and contains a high percentage of fats such as up to 40% or more and a reduced salt content. The permeate containing primarily water along with various salts and/or sugars exits microfilter 38 through line 42.

The permeate from microfilter 38 which is carried in line 42 is fed to nanofilter 44 where the permeate is subjected to a further separation into a second concentrate and a second permeate. As in microfilter 38, a flow of diafiltration water is also fed to nanofilter 44 along with the permeate from the microfilter. A concentrate containing a reduced amount of salt and containing essentially all of the milk sugars leaves nanofilter 44 by line 46. The second concentrate, like the concentrate from reverse osmosis filter of the process of FIG. 2, is suitable for further processing to utilize the contained milk sugars.

A second permeate exits nanofilter 44 contained in line 48 and is primarily purified water with contained salts. This second permeate may be recycled for use in the cooking operation and/or salting operation, may be sent directly to sewage, and/or can be fed to an evaporator or drier (not shown) for separation of at least a portion of the water from the contained salts.

Nanofilter 44 which is used in this embodiment can be selected from various types of filters known in the art which provide a range of separation between reverse osmosis filtration and ultrafiltration and which operate at medium to high pressures, generally from about 150 to 600 psi. As was stated previously, reverse osmosis filters separate relatively smaller components having a molecular weight of less than about 500, that is, on a micromolecular scale of less than 1 nm. On the other hand, ultrafiltration is a selective fractionation type filtration using pressures up to 150 psi to retain and/or purify dissolved or suspended particles of macromolecular species, generally of a specific cut-off from 1000 to 1,000,000 in molecular weight. Fluxes in ultrafiltration are an order of magnitude less than in microfiltration. The membranes and membrane configurations typically used for nanofiltration are of the same generally type as are used in reverse osmosis filtration. Generally nanofilters provide the capability to separate low molecular weight organic compounds from monovalent ions such as from various salts like sodium chloride. Further details as to nanofiltration may be found in the texts by Renner et al. and Ho et al mentioned previously.

In addition to the advantages set forth with regard to the process of FIG. 1, the process of FIG. 3 further provides other distinct and important advantages. Among these advantages are that the nanofiltration provides a concentrate which is highly concentrated in milk sugars such as lactose, etc. that is particularly suitable for other uses. In addition, the permeate from the nanofilter is essentially water containing various salts which is highly suitable for reuse in the cooking unit or in the salting unit and thus significant savings in water and sewage treatment costs can be realized in the operation of these units in terms of water and/or salt requirements.

While the process illustrated in FIG. 3 has been described with reference to the treatment of waste water from a cooking or salting unit in the production of various types of cheese, the process is also particularly suitable for treatment of other waste water in cheese-making operations. For example, in the manufacture of many cheese varieties such as cheddar, colby, montetray jack, barrel, parmesan and the like types of cheese, a waste water commonly known as saltladen whey is produced. This salt-laden whey tends to drain from these types of cheese after the curd has been salted and pressed into a suitable shape. Salt-laden whey can be treated by the process of FIG. 3 to produce essentially similar results and advantages with the exception that the second permeate may not be suitable for return to the cooking unit or the salting operation.

Of particular significance to the processes of the subject invention as described above is the provision of subjecting the waste or contaminated water to a microfiltration operation. Significantly, the use of the microfiltration allows both the nearly total recovery of fats from the waste water from cheese-making operations and the reuse or recycle of treated and filtered water back to the initial or early processing steps of the cheese manufacture.

More specifically, the ability to effectively use microfilters in the treatment of the waste water in cheesemaking operations may be due to, among other things, the nature of the membrane material and the configuration of the membrane elements of the microfilters. Generally, the presently preferred ceramic membrane materials are very hydrophilic and have a homogeneous pore size which provide for an essentially complete separation of fats. In addition, the preferred ceramic membrane materials have greater structural strength than polymeric membrane materials which allows the use of permeate back pulsing and thus the membranes may be cleaned under more rigorous conditions. Furthermore, the use of a configuration of the elements having relatively large bore channels facilitates pumping of the viscous concentrate.

Thus the process of the subject invention specifically recognizes and uses to advantage, among other things, the specific nature and capabilities of microfiltration alone or in conjunction with other types of filtration such as hyperfiltration and nanofiltration in the treatment of waste water from cheese-making operations. More specifically, by recognizing that microfiltration is particularly suitable for the treatment of such waste water, benefits such as enhanced use of the components contained in the milk or milk products used as the starting materials in the cheese manufacture and reduction or even elimination of disposal problems typically associated with the waste water from such manufacturing operations.

Conditions for operating the above described processes may vary considerably depending upon, among other things, the particular composition of the waste water being treated in terms of types of materials to be removed and their respective concentrations as well as its input temperature and flow rate, the degree to which the material is to be removed from the waste water and the particular type, composition and configuration of the membranes used in the various filtration systems being utilized. Generally, the pressure and temperatures utilized may vary significantly depending upon the particular type of filtration being conducted although it is preferred that the temperature of the waste water be maintained at a temperature below that which degrades the components contained therein as well as the filter apparatus. Other operating conditions such as filtration residence time, amount of material recycled and the like may also vary considerably.

Specific processes according to the invention are presented in the following examples. It should be understood that the examples are given herein for the purposes of illustration and do not limit the invention as has been heretofore described to these particular examples.

EXAMPLE 1

Waste water from a cooking unit preparing mozzarella type cheese was subjected to a process as illustrated in FIG. 1. The microfilter used in the process contained a 0.05 micron ceramic membrane in a spiral type configuration. The filter was operated at 1.4 bar TMP and 120° F. with a 22 gpm/element crossflow of the waste water. A permeate back pressure of about 3 psig was maintained on the ceramic filter. The results of the process in terms of the concentrate from the microfilter are set forth in Table 1.

TABLE 1

| Time (min.) | NaCl (%) | Fat (% by Moj) | Total Solids (%) | Total Protein (%) |
|---|---|---|---|---|
| 0 | 4.1 | 17.8 | 25.0 | 0.4 |
| 60 | 4.0 | 23.9 | 30.9 | 0.58 |
| 90 | 4.0 | 25.7 | 32.7 | 0.67 |
| 125 | 3.1 | 30.0 | 36.7 | 0.96 |
| 160 | 3.1 | 35.9 | 42.4 | — |
| 185 | 3.0 | 41.5 | 47.9 | — |

The results of the process in terms of the permeate from the microfilter are set forth in Table 2.

TABLE 2

| Time (min.) | NaCl (%) | Fat (% by Moj) | Total Solids (%) | Total Protein (%) |
|---|---|---|---|---|
| 0 | 5.1 | 0.00 | 7.6 | 0.74 |
| 60 | 5.1 | 0.01 | 7.8 | 0.76 |
| 90 | 5.1 | 0.01 | 7.8 | 0.77 |
| 125 | 5.1 | 0.01 | 7.9 | 0.78 |
| 160 | 5.1 | 0.01 | 7.9 | 0.80 |
| 185 | 5.1 | 0.01 | 7.9 | 0.83 |

EXAMPLE 2

The process of Example 1 was repeated under the same conditions except that a permeate back pressure of about 0 psig was used. The results of the process in terms of the concentrate from the microfilter are set forth in Table 3.

TABLE 3

| Time (min.) | NaCl (%) | Fat (% by Moj) | Total Solids (%) | Total Protein (%) |
|---|---|---|---|---|
| 0 | 5.1 | 14.6 | 22.2 | — |
| 20 | 5.1 | 18.1 | 25.6 | — |
| 40 | 5.1 | 21.1 | 28.6 | — |
| 60 | 5.1 | 31.6 | 32.5 | — |
| 85 | 5.0 | 32.3 | 40.0 | — |
| 120 | 3.1 | 45.5 | 53.3 | — |
| 135 | 3.1 | 47.8 | 57.3 | — |

The results of the process in terms of the permeate are set forth in Table 4.

TABLE 4

| Time (min.) | NaCl (%) | Fat (% by Moj) | Total Solids (%) | Total Protein (%) |
|---|---|---|---|---|
| 0 | 6.1 | 0.02 | 8.5 | 0.60 |
| 20 | 7.0 | 0.02 | 9.1 | 0.63 |
| 40 | 7.1 | 0.02 | 9.4 | 0.66 |
| 60 | 7.1 | 0.03 | 9.5 | 0.68 |
| 85 | 7.1 | 0.02 | 9.6 | 0.70 |
| 120 | 7.1 | 0.02 | 9.8 | 0.78 |
| 135 | 7.1 | 0.01 | 9.8 | 0.83 |

EXAMPLE 3

The process of Example 1 was repeated under the same conditions except that a permeate back pressure of about 0 psig was used. The results of the process in terms of the concentrate from the microfilter are set forth in Table 5.

TABLE 5

| Time (min.) | NaCl (%) | Fat (% by Moj) | Total Solids (%) | Total Protein (%) |
|---|---|---|---|---|
| 0 | 6.0 | 8.8 | 20.1 | 0.62 |
| 20 | 6.0 | 13.1 | 23.1 | 0.65 |
| 40 | 6.0 | 15.7 | 25.7 | 0.77 |
| 60 | 6.0 | 19.0 | 29.3 | 0.91 |
| 85 | 5.1 | 27.1 | 36.0 | 1.25 |
| 105 | 3.0 | 31.7 | 43.0 | 2.08 |
| 150 | 4.0 | 40.1 | 52.8 | — |

The results of the process in terms of the permeate are set forth in Table 6.

TABLE 6

| Time (min.) | NaCl (%) | Fat (% by Moj) | Total Solids (%) | Total Protein (%) |
|---|---|---|---|---|
| 0 | 6.1 | 0.00 | 8.8 | 0.65 |
| 20 | 7.1 | 0.01 | 10.0 | 0.73 |
| 40 | 7.1 | 0.01 | 10.3 | 0.74 |
| 60 | 8.0 | 0.00 | 10.4 | 0.76 |
| 85 | 8.0 | 0.00 | 10.6 | 0.79 |
| 105 | 8.0 | 0.00 | 10.5 | 0.82 |
| 150 | 7.1 | 0.00 | 10.6 | 0.89 |

Of particular interest in the above data was that protein levels were lower than expected but the test utilized in determining protein levels did not differentiate between true protein and nonprotein nitrogen. Also of particular interest was that the decrease in the salt level of the concentrate which indicated that the salt was excluded by the entrained fat.

Figure 4:
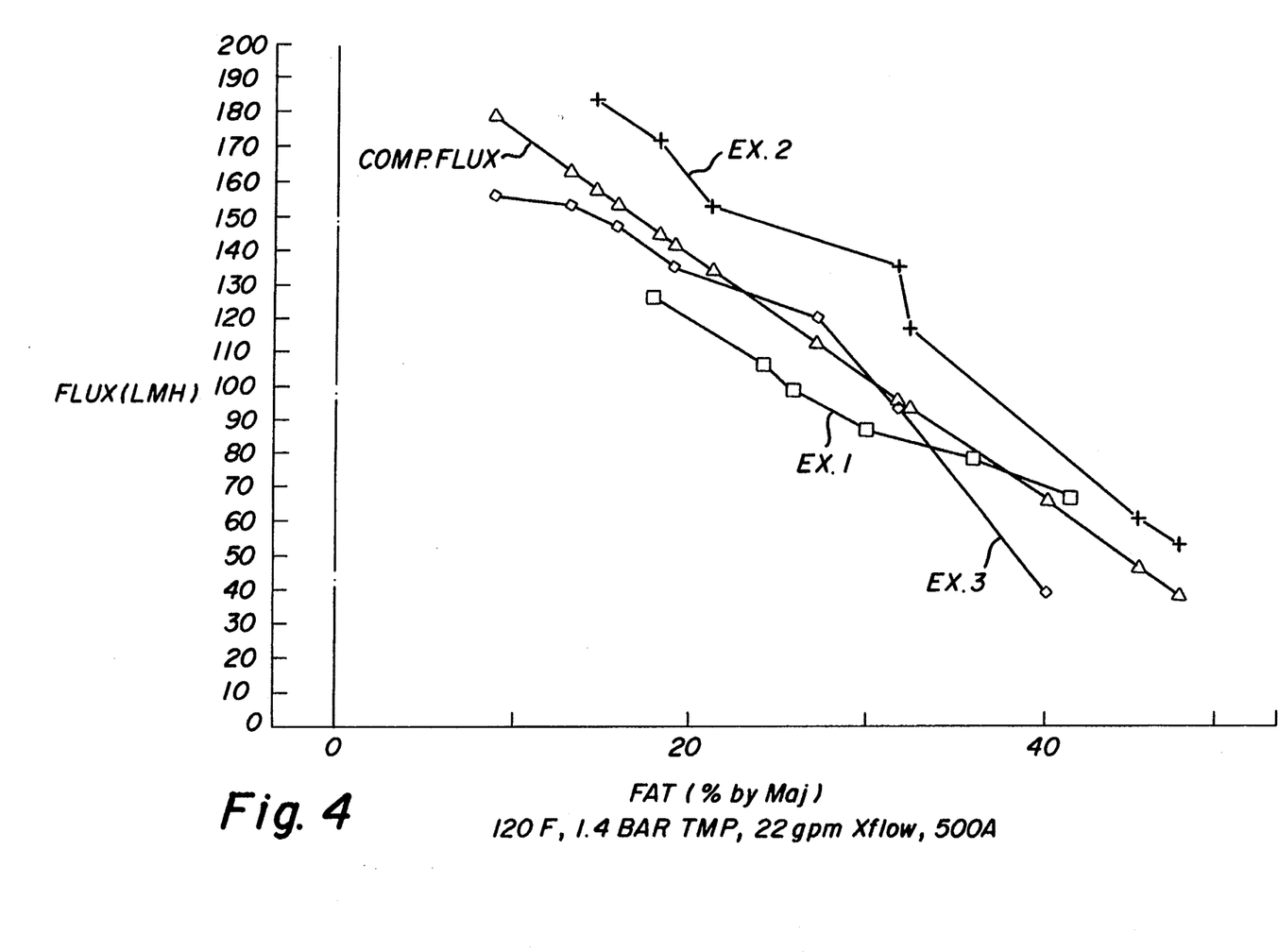
FIG. 4 is a plot of flux versus fat content of three illustrative examples of the process illustrated in FIG. 1.
Figure 5:
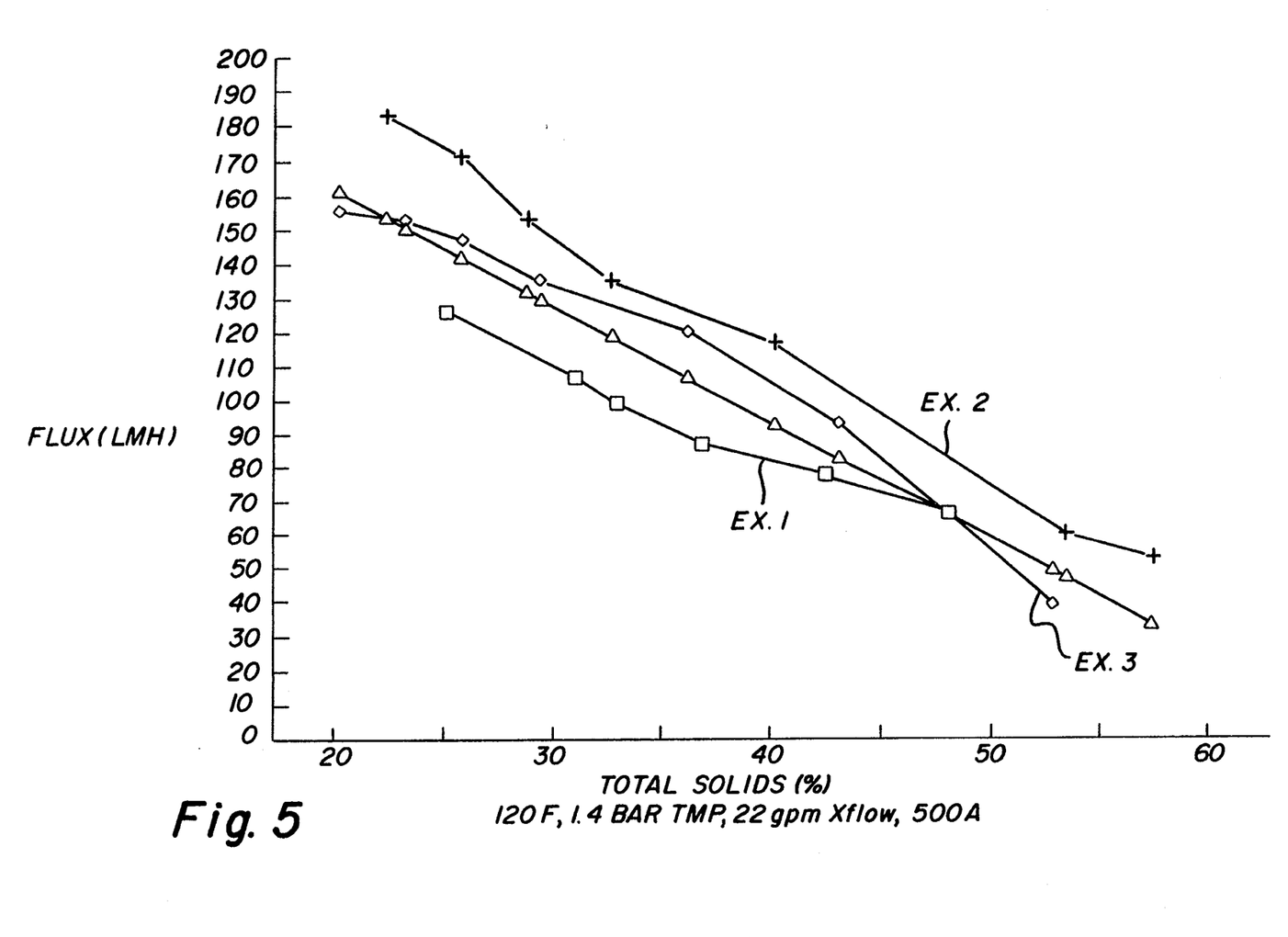
FIG. 5 is a plot of flux versus total solids content of three illustrative examples of the process illustrated in FIG. 1.

The above results of Tables 1–6 were then graphically plotted in terms of flux (quantity of water flow per unit of time) versus fat percentage in the concentrate as shown in FIG. 4 and in terms of flux versus total solids percentage in the concentrate as shown in FIG. 5. In addition, each of the three examples were combined to yield a composite as indicated by the plot entitled Comp. Flux. As is apparent from FIG. 4, all of the examples achieved a fat content of at least about 40% in the concentrate from the microfilter and, as shown in FIG. 5, all of the examples achieved total solids content of at least 50% in the concentrate from the microfilter.

In addition, it can be observed that, in each of the three examples, where the waste water feed had a fat concentration of between 9.8 and 17.8%, the waste water was concentrated approximately 2.5 times to a final fat concentration between 40 and 47%. The flux data as illustrated in FIGS. 4 and 5 indicate an almost linear relationship between flux and fat concentration and a maximum theoretical fat concentration of 55%.

While there has been shown and described what are considered to be preferred embodiments of the present invention, it will be apparent to those skilled in the art to which the invention pertains that various changes and modifications may be made therein without departing from the invention as defined in the appended claims.

It is claimed:

1. A cheese-making process comprising treating a milk product so as to form curd and whey, separating the curd from the whey, contacting the curd with water at an elevated temperature in a cooking operation to form a water containing material including milk fats, separating the curd from a water-containing material including milk fats, subjecting the water-containing material including milk fats to microfiltration in a microfilter containing a ceramic membrane so as to produce a concentrate rich in said milk fats and a permeate, and recovering said concentrate and said permeate.

2. A process in accordance with claim 1 wherein the concentrate from the microfilter contains from about 10 to 50% fats.

3. A process in accordance with claim 2 wherein the concentrate from the microfilter contains at least about 40% fats.

4. A process in accordance with claim 2, further including returning said permeate to be in contact with the curd.

5. A process in accordance with claim 2 further including subjecting the permeate from the microfilter to reverse osmosis filtration in a reverse osmosis filter to produce a second concentrate and a second permeate.

6. A process in accordance with claim 5, further including returning said second permeate to be in contact with the curd.

7. A process in accordance with claim 5 wherein the concentrate from the microfilter contains at least about 40% fats.

8. A process in accordance with claim 2 further including subjecting the permeate from the microfilter to nanofiltration in a nanofilter to produce a second concentrate and a second permeate.

9. A process in accordance with claim 8, further including returning said permeate to be in contact with the curd.

10. A process in accordance with claim 8 wherein the concentrate from the microfilter contains at least about 40% fats.

* * * * *